United States Patent
Liptay et al.

(10) Patent No.: US 6,745,313 B2
(45) Date of Patent: Jun. 1, 2004

(54) ABSOLUTE ADDRESS BITS KEPT IN BRANCH HISTORY TABLE

(75) Inventors: John S. Liptay, deceased, late of Rhinebeck, NY (US), by Lynne M. Liptay, executrix; Mark A. Check, Hopewell Junction, NY (US); Brian R. Prasky, Wappingers Falls, NY (US); Chung-Lung Kevin Shum, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 10/042,533

(22) Filed: Jan. 9, 2002

(65) Prior Publication Data

US 2003/0131212 A1 Jul. 10, 2003

(51) Int. Cl.$^7$ ................................................ G06F 12/00
(52) U.S. Cl. ...................... 711/203; 712/233; 712/240
(58) Field of Search ...................... 711/3, 202–204; 712/228, 248, 233–240

(56) References Cited

U.S. PATENT DOCUMENTS

| | | | |
|---|---|---|---|
| 3,781,808 A | 12/1973 | Ahearn et al. ............... 711/207 |
| 4,797,817 A | 1/1989 | Nguyen et al. ............... 711/204 |
| 5,067,078 A | 11/1991 | Talgam et al. ................. 711/3 |
| 5,148,538 A | * 9/1992 | Celtruda et al. ............. 711/205 |
| 5,317,704 A | 5/1994 | Izawa et al. ................. 711/207 |
| 5,625,808 A | 4/1997 | Webb et al. ................. 712/248 |
| 5,768,575 A | * 6/1998 | McFarland et al. ......... 712/228 |
| 5,893,930 A | * 4/1999 | Song ........................... 711/205 |
| 6,026,488 A | 2/2000 | Liptay et al. ............... 712/235 |
| 6,138,223 A | * 10/2000 | Check et al. ............... 711/204 |

\* cited by examiner

Primary Examiner—Nasser Moazzami
(74) Attorney, Agent, or Firm—Lynn Augspurger; Cantor Colburn LLP

(57) ABSTRACT

A method is disclosed for selecting data in a computer system having a cache memory and a branch history table, where the method includes predicting an address corresponding to the data, selecting data at the predicted address in the cache memory, translating an address corresponding to the data, comparing the translated address with the predicted address, and if they are different, re-selecting data at the translated address in the cache memory and appending the translated address to the branch history table.

18 Claims, 2 Drawing Sheets

ABSOLUTE ADDRESS BITS KEPT IN BRANCH HISTORY TABLE

BACKGROUND

There are a variety of ways to organize and access data in cache memories. In some processors, the cache data is organized by absolute address rather than by virtual address. The absolute address is the address at which the data is located in main storage, and the virtual address is the address at which the data is located relative to the calling program. However, when data is to be fetched from the cache, the only address initially available is the virtual address. Because of the size of the cache and because some bits of the address may be changed during translation from the virtual address to the absolute address, some bits of the translated absolute address that are needed to uniquely define the location of the desired data in the cache are not available in the virtual address. The correct absolute address bits are held in the translation look-aside buffer (or "TLB"). Since accessing the translation look-aside buffer is done at the same time as the reading of the cache directory and data, the absolute address bits needed from the translation look-aside buffer to find the data in the cache are not available in time for the initial cache access.

This problem has existed on some processors for many years. The problem has been handled by reading from every location in the cache that the desired data could have been, and then sorting out the particular piece of desired data after all of the address information became available. This took a lot of comparison circuits and had a potential impact on the cycle time of the processor. The IBM® Alliance® processors introduced a structure called an absolute address history table (or "AAHT") to predict the values of the absolute address bits that were needed. Unfortunately, the prior solutions did not adequately predict absolute address bits for accessing an instruction cache in the case of branch instructions.

SUMMARY

This disclosure presents a method for selecting data in a computer system having a cache memory and a branch history table where the method includes predicting an address corresponding to the data, selecting data at the predicted address in the cache memory, translating an address corresponding to the data, comparing the translated address with the predicted address, and if they are different; re-selecting data at the translated address in the cache memory and appending the translated address to the branch history table.

BRIEF DESCRIPTION OF THE DRAWINGS

The present disclosure will be better understood, and its numerous features and advantages will become apparent to those skilled in the pertinent art by referencing the accompanying drawings, in which.

DETAILED DESCRIPTION

Figure 1:
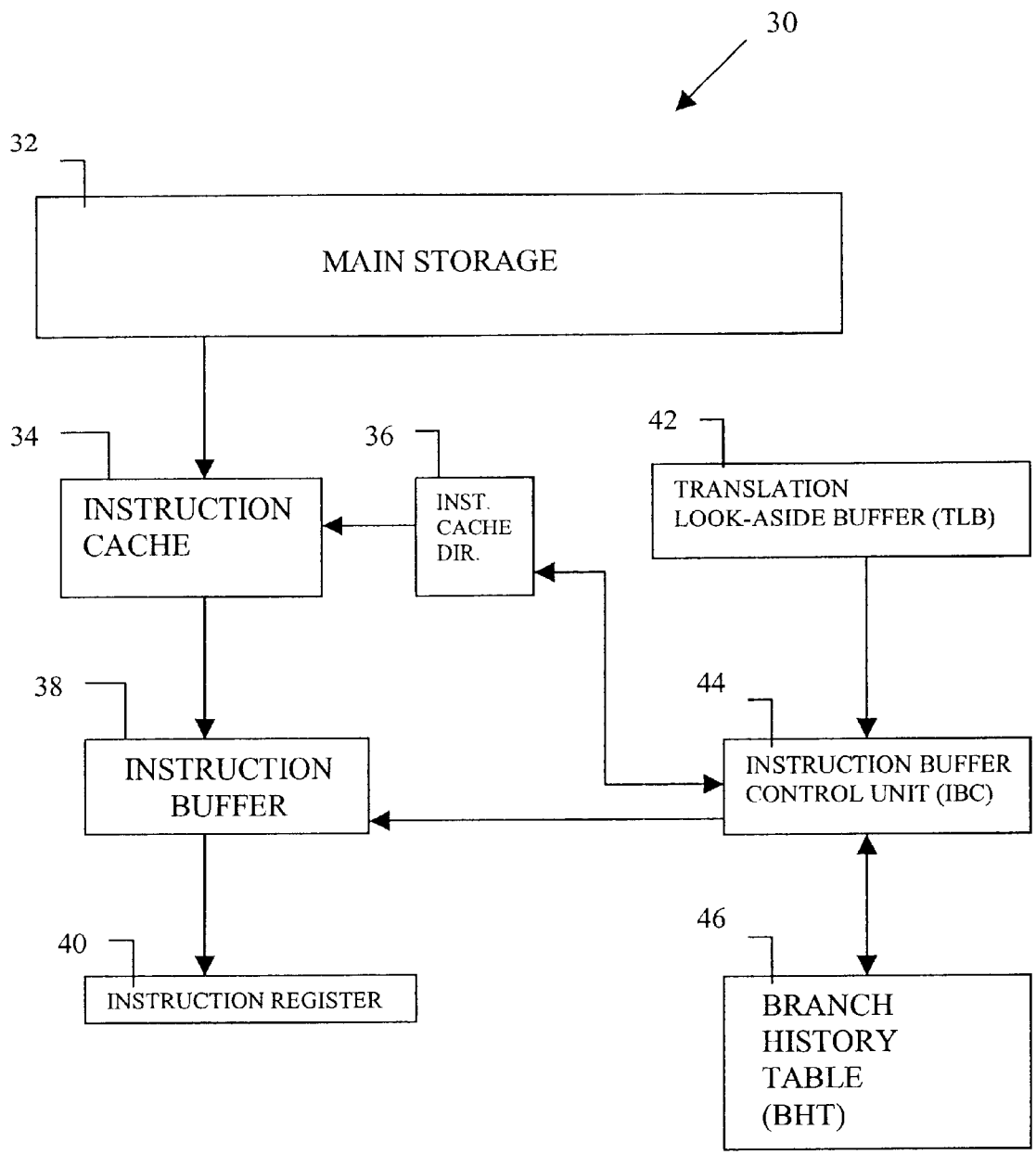
FIG. 1 shows a block diagram of an exemplary embodiment processing system.

As shown in FIG. 1, reference numeral 30 generally indicates a portion of an exemplary processor, such as, for example, an IBM® BlueFlame® processor. The processor 30 includes a main storage memory unit 32, and an instruction cache memory unit 34 that reads from the main memory unit 32. The main unit 32 contains the program instructions that the processor is to execute as well as the data that those instructions are to manipulate. The instruction cache memory 34, which generally includes copies of some of the instructions that the processor is scheduled to execute, is the instruction cache portion of a split cache memory unit providing interleaved double word addressing in this exemplary embodiment. The instruction cache memory 34 logically includes contiguously addressable storage for instructions, and is indexed according to the original absolute addresses of the instructions in the main memory unit 32 by an instruction cache directory 36.

An instruction buffer 38 receives instructions from the cache 34 whose execution is imminent, and, in turn, passes these instructions on to an instruction register 40 for actual execution. A translation look-aside buffer (or "TLB") 42 translates the actual absolute addresses of the instructions to be executed from their virtual addresses relative to the currently executing program. An instruction buffer control unit (or "IBC") 44 receives the actual translated absolute addresses of the desired instructions from the translation look-aside buffer 42, and communicates these addresses to the directory 36 to effect retrieval of the desired instructions from the instruction cache 34 to the instruction buffer 38. When a branch instruction is encountered, the instruction buffer control unit checks a branch history table (or "BHT") 46 to determine whether the particular branch instruction's absolute address has been previously stored in the branch history table 46. If the branch instruction is found there, this is called a branch history table "hit" and the instruction buffer control unit retrieves the absolute address for the succeeding target instruction from the branch history table 46 and transmits the absolute address to the directory 36 to effect retrieval of the desired target instruction from the cache 34 to the buffer 38.

If the branch instruction entry is not found in the branch history table 46, the instruction buffer control unit 44 will provide a predicted absolute address to the cache directory 36 in an attempt to retrieve the desired target instruction from the cache 34. When the absolute address of the target instruction becomes available from the translation look-aside buffer 42, the instruction buffer control unit 44 compares this actual absolute address with the predicted address. If the actual and predicted addresses are not identical, the instruction buffer control unit 44 updates its own absolute address offset bits and instructs the instruction buffer 38 to disregard the instruction received from the cache 34, and the instruction buffer control unit 44 instructs the directory 36 to provide the instruction having the correct absolute address to the buffer 38. Thus, in cases where the actual and predicted addresses are not identical, the instruction buffer control unit 44 updates its own absolute address offset bits in order to provide more accurate predictions of the absolute address for future instructions. In addition, in the case of branch instructions, the instruction buffer control unit 44 also updates the actual absolute address bits stored in the branch history table 46 for each branch instruction encountered so that the correct absolute address bits will be found the next time that that branch instruction is encountered.

Figure 2:
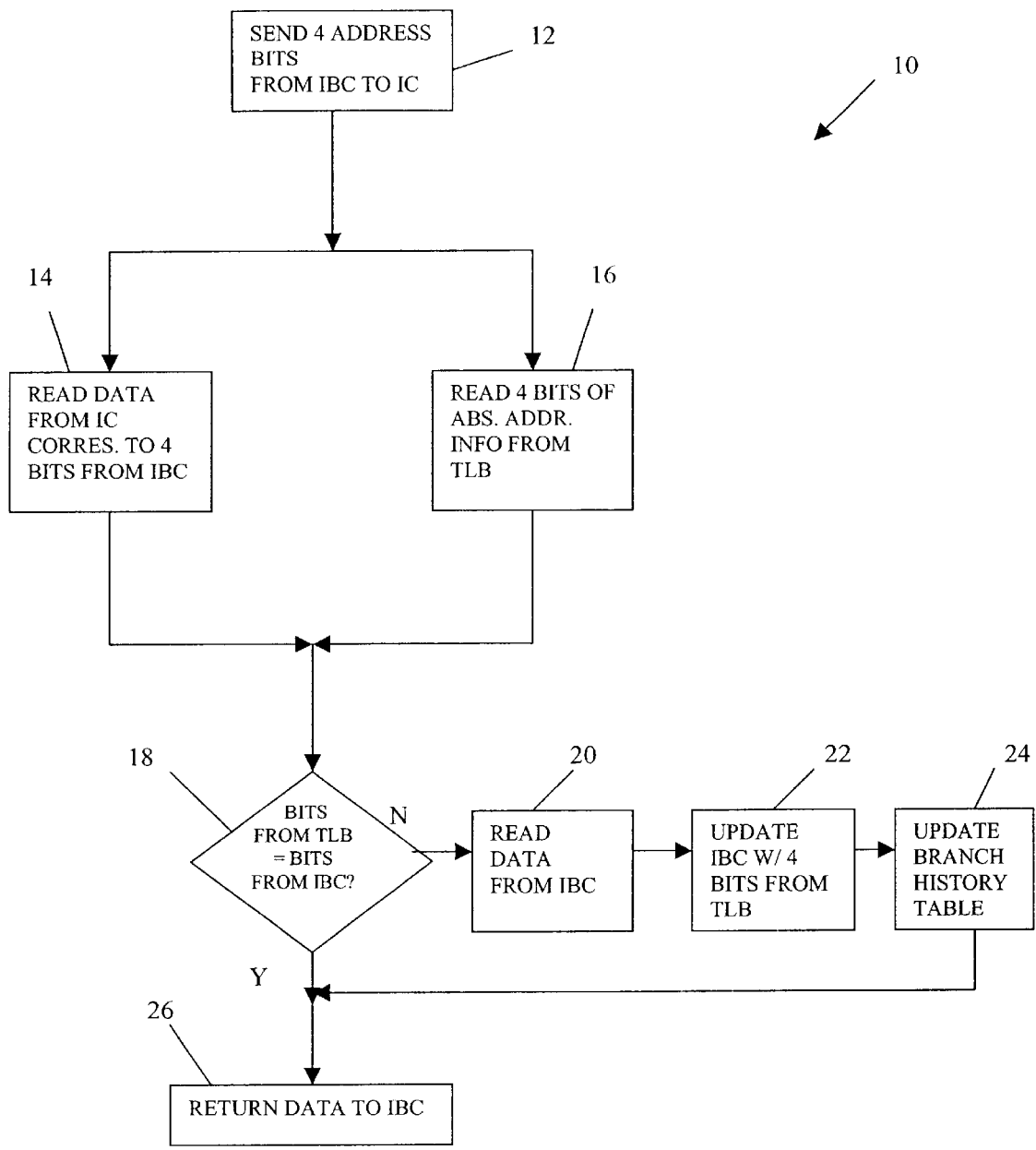
FIG. 2 shows a flowchart for a method of selecting data usable in the processing system of FIG. 1.

Turning now to FIG. 2, a method for selecting data in a computer system is designated generally by the reference numeral 10. On the IBM® BlueFlame® processor, for example, six instruction buffer control units 44 of FIG. 1 are provided that make requests from the instruction cache 34 of FIG. 1. Each of these six instruction buffer control units works with a single cache line at a time. The instruction buffer control units are designed to remember four significant bits of the absolute address from the location of the previous instruction. Whenever one of the instruction buffer control units makes a cache request, it also sends the four absolute address bits to the instruction cache, as indicated by function block 12, where they are used by the cache directory to determine where to find the desired instruction data, as indicated by function block 14. It is not guaranteed that the bits from the instruction buffer control units are correct. Therefore, after the cache has been read, the instruction cache compares the bits received from the instruction buffer control units to the corresponding bits found in the translation look-aside buffer 42 of FIG. 1, as indicated by function blocks 16 and 18. If they are different, the instruction cache takes two extra clock cycles to repeat the fetch as indicated by function block 20 in order to get the correct data, and then sends the correct absolute address bits back to the instruction buffer controls, as indicated by function block 22, where they are used to update the bits previously held. The updated bits are then used for subsequent fetches to that instruction buffer until the next update. The address is remembered for the branch instruction by copying the address to the branch history table 46 of FIG. 1, as shown in function block 24. The desired data is fetched by the instruction buffer control unit as indicated in function block 26.

When an instruction buffer is started, the initial absolute address bits are loaded from the branch history table. There are four absolute address bits in each branch history table entry, which are associated with the target address remembered for the branch by function block 24. When an instruction buffer is started as a result of a branch history table hit, these bits are used to set the 4 highest-order address bits in the instruction buffer, and are then used for all fetches made by that instruction buffer unless the instruction cache corrects them. When an entry is written into the branch history table, the four absolute address bits from the instruction buffer associated with the target address are written into the entry, and are therefore saved until the next time the branch is encountered. If a branch was found in the branch history table, and the instruction cache corrects the absolute address bits when they are used, the entry is rewritten after the branch executes in order to update the bits, even if there would not otherwise be a reason to rewrite it. Thus, there is a mechanism for getting correct absolute address bits from the instruction cache into the branch history table so that the correct value will be available if the branch is encountered again.

An advantage of the above-described method is that clock cycles may be saved when accessing the instruction cache whenever the predicted absolute address bits turn out to be correct. Another advantage is that the branch history table provides accurate predictions of the absolute address bits for branch instructions that are executed more than once. While exemplary embodiments have been shown and described, those of ordinary skill in the pertinent art may make various modifications and substitutions thereto without departing from the spirit and scope of the present disclosure. Accordingly, it is to be understood that the present disclosure has been made by way of illustration only, and such illustrations and embodiments as have been disclosed herein are not to be construed as limiting to the claims.

What is claimed is:

1. A method of processing instruction data in a computing system having a cache memory comprising:
   receiving a branch instruction;
   determining if said branch instruction is present in a branch history table;
   if said branch instruction is in said branch history table, providing an absolute address based on the contents of said branch history table;
   if said branch instruction is not in said branch history table;
   predicting an address corresponding to the instruction data;
   selecting instruction data corresponding to the predicted address from the cache memory;
   translating an address corresponding to the instruction data;
   comparing the translated address with the predicted address.

2. A method as defined in claim 1 wherein predicting comprises predicting an absolute address of the instruction data in main storage based on an actual virtual address and a predicted address offset.

3. A method as defined in claim 1 wherein selecting comprises selecting instruction data corresponding to the predicted absolute address from the cache memory.

4. A method as defined in claim 1 wherein translating comprises translating an actual absolute address corresponding to the instruction data.

5. A method as defined in claim 1, further comprising:
   retrieving the instruction data selected by at least one of the predicted and translated addresses.

6. A method as defined in claim 1 wherein the computing system comprises a microprocessor.

7. A method as defined in claim 1 wherein the cache memory comprises an instruction cache memory and a data cache memory.

8. A method as defined in claim 1 further comprising:
   re-selecting data corresponding to the translated address from the cache memory; and
   appending the translated address to the branch history table.

9. A method as defined in claim 8 wherein re-selecting comprises re-selecting instruction data corresponding to the translated absolute address from the cache memory.

10. A method as defined in claim 8 wherein appending comprises replacing the predicted address offset with the translated address offset in the branch history table.

11. A method of addressing data in a cache memory unit of a computing system having a translation look-aside buffer, an instruction buffer control unit and a branch history table, the method comprising:
   translating a first virtual address into a first absolute address in the translation look-aside buffer;
   saving the first absolute address into the instruction buffer control unit; and
   appending an entry comprising the first absolute address into the branch history table;
   encountering a branch instruction; and
   checking the branch history table to detect an entry corresponding to the branch instruction.

12. A method as defined in claim 11, further comprising:
   receiving a second virtual address into the instruction buffer control unit; and
   predicting an absolute address based on the second virtual address and the first saved absolute address.

13. A method as defined in claim 12, further comprising:
   translating the second virtual address into a second absolute address in the translation look-aside buffer; and
   comparing the translated second absolute address with the predicted absolute address.

14. A method as defined in claim 13, further comprising:

saving the second absolute address into the instruction buffer control unit.

15. A method as defined in claim 13, further comprising:

selecting data from the cache memory unit corresponding to the predicted absolute address; and re-selecting data from the cache memory unit corresponding to the translated second absolute address if the result of comparing is non-zero.

16. A method as defined in claim 11, further comprising:

loading the entry comprising an absolute address pointed to by the branch instruction into the instruction burner control unit.

17. A method as defined in claim 11, further comprising:

translating a virtual address corresponding to the branch instruction into an absolute address corresponding to the branch instruction in the translation look-aside buffer;

appending an entry comprising the absolute address corresponding to the branch instruction into the branch history table.

18. A method as defined in claim 11, further comprising:

selecting data from the cache memory unit corresponding to the absolute address pointed to by the branch instruction.

* * * * *